(12) United States Patent
Wagner et al.

(10) Patent No.: US 12,144,477 B2
(45) Date of Patent: Nov. 19, 2024

(54) SECURING SYSTEM

(71) Applicant: SHURTECH BRANDS, LLC, Avon, OH (US)

(72) Inventors: Stephen Robert Wagner, North Olmsted, OH (US); David Adam Worley, Hickory, NC (US); Daniel Eric Festa, Sr., Strongsville, OH (US)

(73) Assignee: SHURTAPE TECHNOLOGIES, LLC, Hickory, NC (US)

( * ) Notice: Subject to any disclaimer, the term of this patent is extended or adjusted under 35 U.S.C. 154(b) by 0 days.

(21) Appl. No.: 18/084,450

(22) Filed: Dec. 19, 2022

(65) Prior Publication Data

US 2023/0120560 A1  Apr. 20, 2023

Related U.S. Application Data

(62) Division of application No. 16/969,147, filed as application No. PCT/US2019/017600 on Feb. 12, 2019, now abandoned.

(60) Provisional application No. 62/629,271, filed on Feb. 12, 2018.

(51) Int. Cl.
*B32B 7/00* (2019.01)
*A47L 13/24* (2006.01)
*A47L 13/256* (2006.01)
*A47L 13/257* (2006.01)
*B32B 7/08* (2019.01)
*A47L 13/22* (2006.01)
*F16B 47/00* (2006.01)

(52) U.S. Cl.
CPC ............ *A47L 13/24* (2013.01); *A47L 13/256* (2013.01); *A47L 13/257* (2013.01); *B32B 7/08* (2013.01); *A47L 13/22* (2013.01); *B32B 2250/40* (2013.01); *B32B 2307/726* (2013.01); *B32B 2432/00* (2013.01); *F16B 47/003* (2013.01)

(58) Field of Classification Search
None
See application file for complete search history.

(56) References Cited

U.S. PATENT DOCUMENTS 3,715,783 A * 2/1973 Parks ................... A41H 37/001
24/265 R
5,566,428 A * 10/1996 Takahashi .............. F16B 45/00
24/265 R
5,775,732 A * 7/1998 Grau ...................... B60R 22/24
297/483

* cited by examiner

*Primary Examiner* — Alexander S Thomas
(74) *Attorney, Agent, or Firm* — Lippes Mathias LLP

(57) ABSTRACT

A securing system includes a fastener and a tape. The fastener includes a main body portion having a first end and a second end, a curved portion extending from the first end, first and second legs extending from the second end, and a roller extending between the first and second legs. The tape may extend around the roller and may be self-adhering.

10 Claims, 13 Drawing Sheets

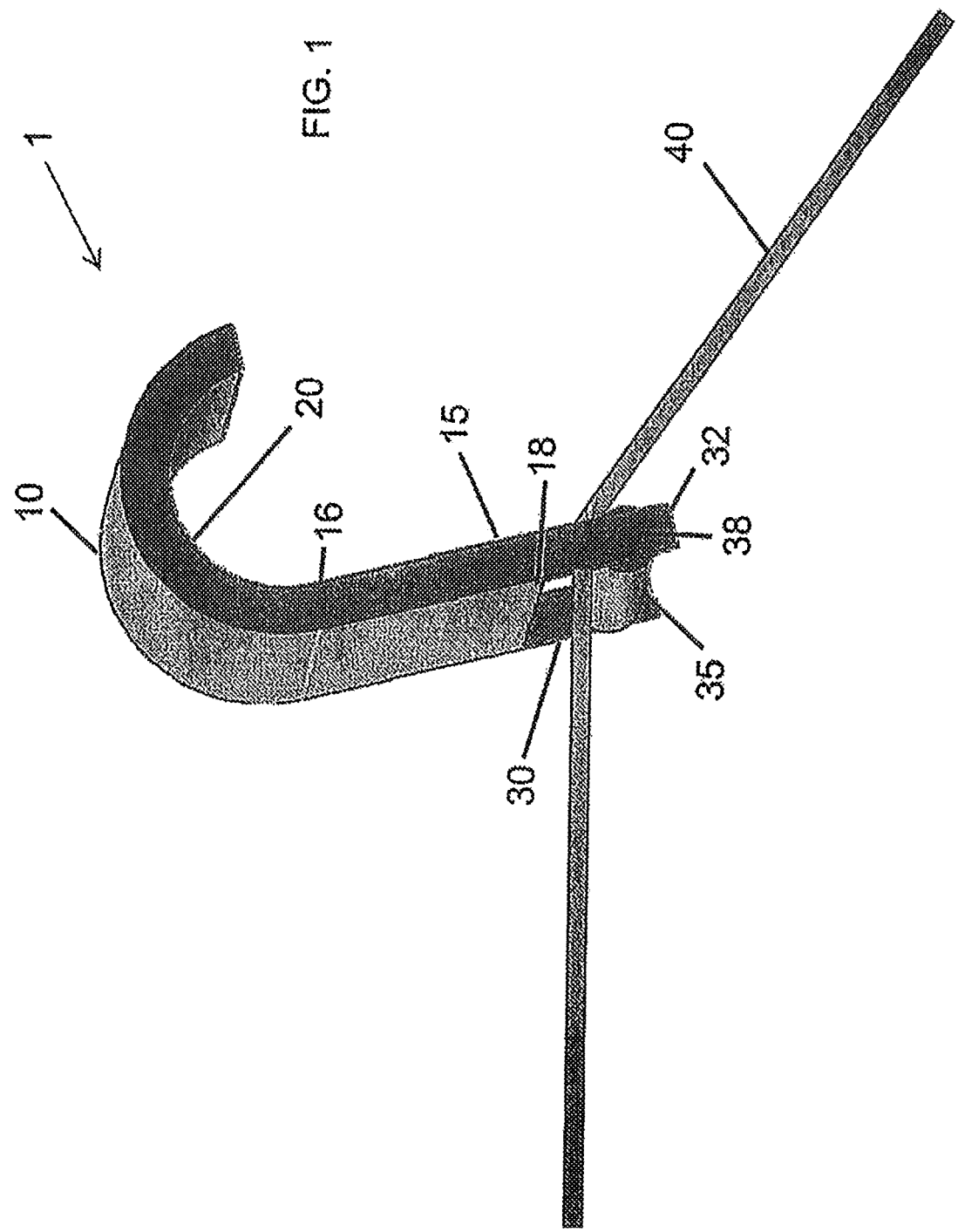

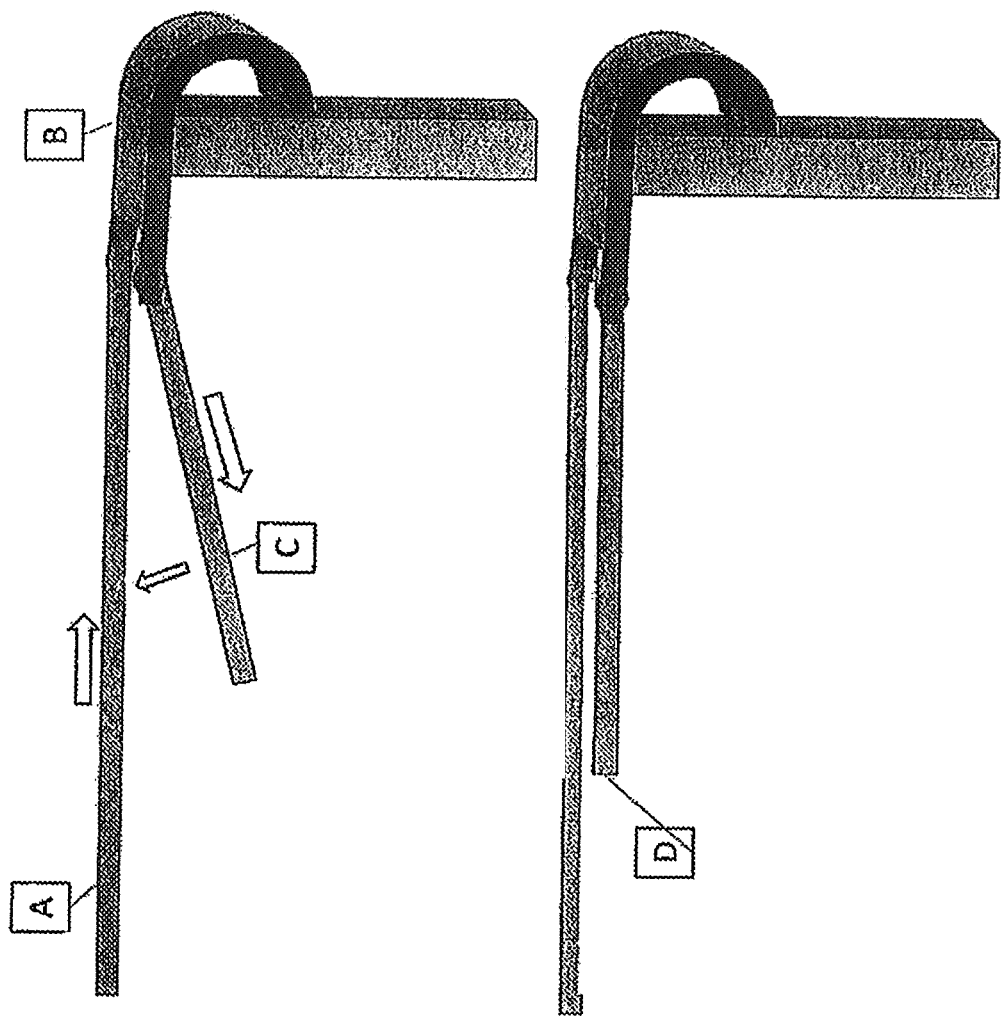

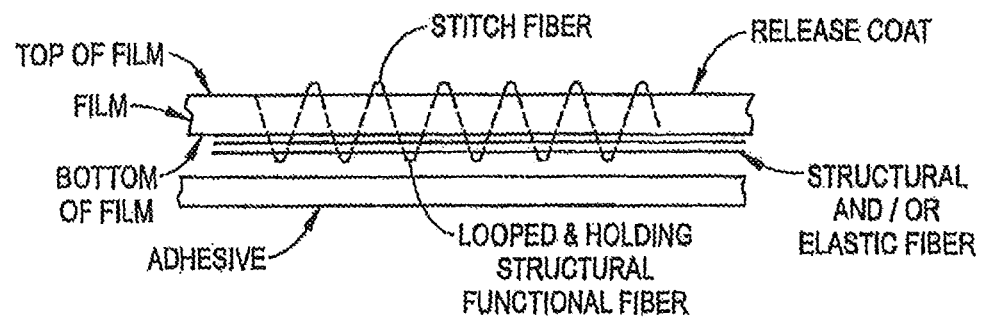
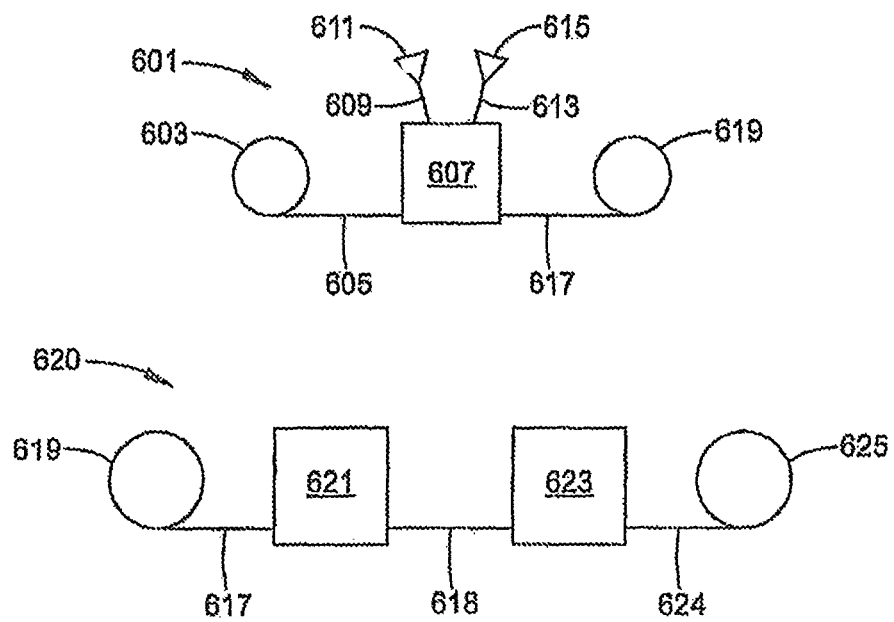
FIG. 9

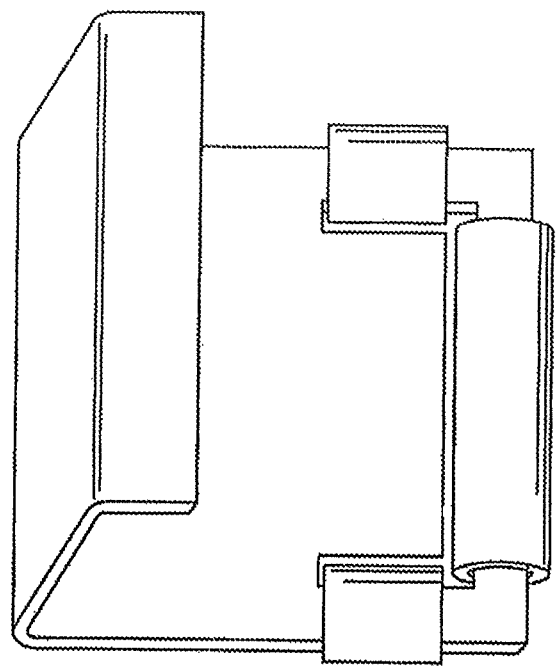
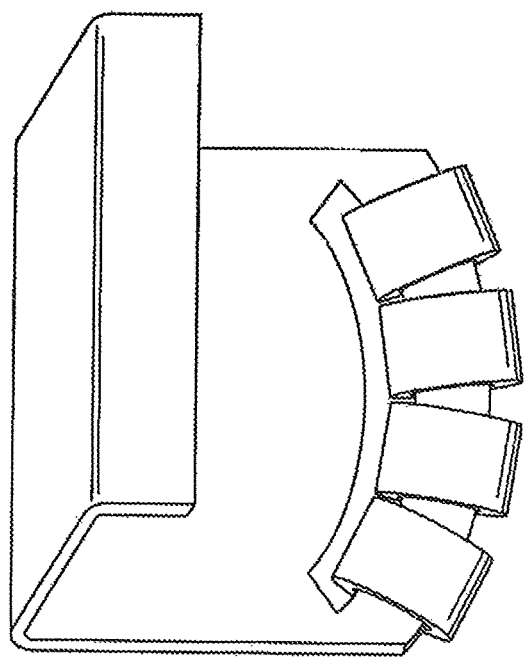
FIG. 12

_US 12,144,477 B2_

SECURING SYSTEM

The present application is a divisional application of U.S. Ser. No. 16/969,147, filed Aug. 11, 2020, now abandoned which claims priority of Provisional Patent Application Ser. No. 62/629,271 filed on Feb. 12, 2018, the disclosures of which are herein incorporation by reference.

BACKGROUND

The present disclosure relates to a securing system. The system may be useful for securing loads. As one example, there is a need for systems for tying down loads when hauling materials (e.g., wood, pipes, etc.) for home improvement/contractor projects. Accordingly, it would be desirable to identify a new securing system with beneficial properties.

BRIEF DESCRIPTION

The present disclosure relates to a securing system.

Disclosed, in some embodiments, is a securing system. The system includes a hook and a tape. The hook includes a main body portion having a first end and a second end, a curved portion extending from the first end, first and second legs extending from the second end, and a roller extending between the first and second legs. The tape may extend around the roller and may be self-adhering.

The first leg may have a first aperture and the second leg may have a second aperture. A pin may extend through the first aperture, axially through the roller, and through the second aperture.

The system may include one hook or a plurality of hooks.

In some embodiments, the roller has a diameter in the range of about 0.5 to about 2 inches.

The roller may have a length in the range of about 1 to about 3 inches.

In some embodiments, the roller comprises a ceramic, silicone, a fluoropolymer, steel, aluminum, and/or carbon fiber.

The roller may include a core and a non-stick surface layer.

In some embodiments, the non-stick surface layer comprises a ceramic, silicone, a fluoropolymer, steel, plastic, polymeric, aluminum, and/or carbon fiber.

The first aperture and the second aperture may have diameters in the range of about 0.5 to about 1.5 inches.

In some embodiments, the pin has a diameter of up to about 1.5 inches.

The pin may have a length of about 1 to about 3 inches.

In some embodiments, the hook comprises nylon, a ceramic material, steel, plastic, polymeric, and/or aluminum.

According to a further embodiment, a securing system comprising a frame, a fastener engaging the frame, and a swivel connector connecting the fastener to the frame is provided. The system also includes an adhesive tape surrounding a portion of the frame.

According to an additional embodiment, a securing method is disclosed. The method involves attaching a fastener of a securing system to an object. The fastener includes a frame and an adhesive tape fed through the frame, wherein a first portion of the adhesive tape which has passed through the frame is adhered to a second portion of the adhesive tape which has not passed through the frame.

In another embodiment, a kit for securing a load is provided. The kit includes a plurality of different shaped fasteners selectively combinable with a frame and an adhesive tape. The frame includes a region through which the tape can be passed and adhered to itself.

In some embodiments, the tape is a stitch-bonded adhesive tape including a substrate layer having an outer substrate surface and an inner substrate surface; and an adhesive layer having an outer adhesive surface and an inner adhesive surface. A plurality of functional fibers are stitched to the substrate layer via stitching fibers.

In other embodiments, the tape is a stitch-bonded adhesive tape including a carrier layer having a first surface and a second surface, a substrate layer on the first surface, and an adhesive layer on the second surface. A plurality of functional fibers are stitch-bonded to the carrier layer via stitching fibers.

Also disclosed is a hook including: a main body portion having a first end and a second end; a curved portion extending from the first end; a first leg extending from the second end; a second leg extending from the second end; and a roller extending between the first leg and the second leg.

The system may include one, two, or more hooks.

According to an additional embodiment, a securing system comprising a frame, a fastener engaging the frame, a swivel connector connecting the fastener to the roller frame and a self-adhering adhesive tape surrounding a portion of the frame is provided. The securing system further includes a second frame including a fastener engaging the second frame and a contiguous strip of the adhesive tape surrounding a portion of the second frame. The securing system can consist of one roller or a plurality of rollers.

BRIEF DESCRIPTION OF THE DRAWINGS

The following is a brief description of the drawings, which are presented for the purposes of illustrating the exemplary embodiments disclosed herein and not for the purposes of limiting the same.

FIG. 1 is a perspective view of a securing system in accordance with some embodiments of the present disclosure.

FIG. 2 is a functional diagram of a securing system in accordance with embodiments of the present disclosure.

FIG. 3 is a functional diagram of the securing system of FIG. 2 after the tape has been self-adhered.

FIG. 9 includes a cross-sectional drawing of an adhesive tape in accordance with some embodiments of the present disclosure, a schematic illustration of a system for producing the tape, and a flow chart illustrating a method which may be used to produce the tape.

FIG. 12 illustrates two additional hook designs with different hook shapes and/or roller placement.

DETAILED DESCRIPTION

Figure 4A:
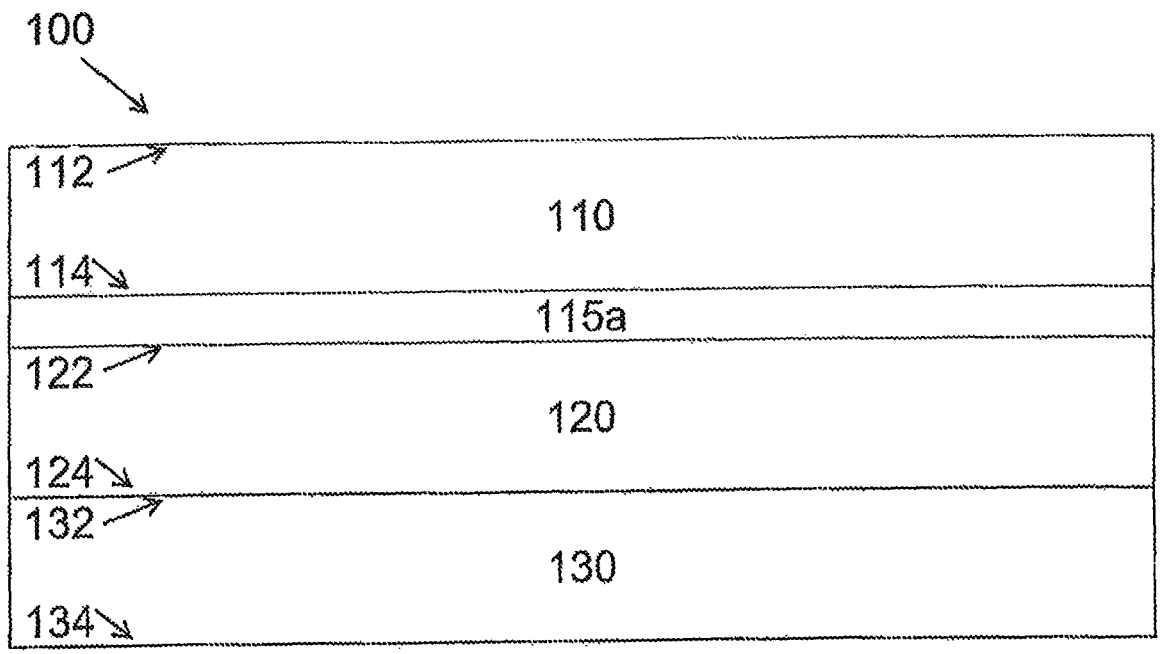
FIG. 4A is a cross-sectional view of an adhesive tape in accordance with certain embodiments of the present disclosure.

The present disclosure may be understood more readily by reference to the following detailed description of desired embodiments included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

FIG. 1 is a perspective view of a securing system 1 in accordance with some embodiments of the present disclosure. The system 1 includes a hook 10 and tape 40. The hook 10 includes a main body portion 15 and a curved portion 20. The main body portion 15 and the curved portion 20 may be integral or separate. The main body portion 15 includes a first end 16 and a second end 18. The curved portion 20 extends from the first end 16. First and second legs 30, 32 extend from the second end 18. A roller 35 extends between the legs 30, 32 and is secured thereto via a pin 38. The tape 40 is provided to the roller 35. Although the depicted embodiment includes one roller and one piece of tape, a plurality of rollers and/or pieces of tape may be included in other embodiments. Furthermore, the hook may be replaced by a different type of fastener. Non-limiting examples of alternative fasteners include clips (e.g., carabiners), bolts, nuts, nails, stakes, and screws.

FIG. 2 is a functional diagram of a securing system in accordance with embodiments of the present disclosure. FIG. 3 is a functional diagram of the securing system of FIG. 2 after the tape has been self-adhered.

The depicted hook includes a main body portion having a first end and a second end; a curved portion extending from the first end; a first leg extending from the second end; a second leg extending from the second end; and a roller extending between the first leg and the second leg. However, it should be understood that other ring and hook structures may be used in addition to or instead of the depicted hook. Additionally, the systems and methods of the present disclosure may utilize one, two, three, four, or more rings and/or hooks which may be the same or different.

The main body portion, curved portion, first leg, second leg, and the roller may be made from the same or different materials. In some embodiments, the materials for these components are independently selected from plastic materials, metals, metal alloys, metal composites, polymers (e.g., styrene polymers), and polymer blends. The polymer or polymer blend is optionally reinforced. Non-limiting examples of reinforcement materials include glass fibers, carbon fibers, and aramid fibers.

The main body portion and the curved portion may be a unitary structure or may be distinct pieces. In embodiments wherein the main body portion and the curved portion are distinct pieces, they may be fixed to one another or may be permitted to move relative to one another. For example, the curved portion may be able to move axially or radially with respect to a main axis of the main body portion. In particular embodiments, the curved portion and the main body portion are hinged together.

The hook may have dimensions of from about 0.5 to about 1.5 inches.

The main body portion and the curved portion may be made from the same or different compositions. Non-limiting examples of materials that may be useful in the main body portion and the curved portion include nylon, steel, aluminum, polycarbonate, plastic, polymeric and carbon fiber.

The roller may be made from a non-stick material or may include a core layer and a non-stick surface layer. Non-limiting examples of non-stick materials include a ceramic, silicone, a fluoropolymer, nylon, steel, plastic, polymeric, aluminum, polycarbonate, and carbon fiber. In some embodiments, the fluoropolymer is polytetrafluoroethylene.

The roller may have a diameter in the range of about 0.5 to about 2 inches.

The roller may have a length in the range of about 1 to about 3 inches.

In some embodiments, the hook further includes a first aperture or recess in the first leg; a second aperture or recess in the second leg; and a pin extending from the first aperture or recess through the roller to the second aperture or recess.

A securing system containing the hook may further include an adhesive tape. The adhesive tape may extend around the roller and may be self-adhering.

In some embodiments, the hook with roller allows adhesive tape to pass through and move freely. The system may be used like a ratchet strap system, but with the adhesive tape. The adhesive tape may be reused, repositioned, or discarded depending on the situation.

The concepts disclosed herein may be broadly applied to other hook, line set, tethering, or securing systems and projects.

Referring to FIGS. 2 and 3, in element A, the adhesive tape is fed through the pulley-hook system. In element B, the hook is affixed to a secure row/strapping point. In element C, the tape is tightened through the pulley-hook adding tensile strength and tightening the strapping apparatus. In element D, the tape is adhered to itself (adhesive-to-adhesive) to form a secure bond.

FIG. 4A is a cross-sectional view of an adhesive tape 100 in accordance with selected embodiments of the present disclosure. The tape 100 includes a substrate (e.g., film) layer 110 having a top surface 112 and a bottom surface 114, a carrier (e.g., nonwoven, foam, etc.) layer 120 having a top surface 122 and a bottom surface 124, an adhesive layer 130 having a top surface 132 and a bottom surface 134, and a functional fiber layer 115a between the substrate layer 110 and the carrier layer 120. The functional fiber layer 115a is stitch bonded to the bottom surface 114 of the substrate layer 110 or the top surface 122 of the carrier layer 120.

Figure 4B:
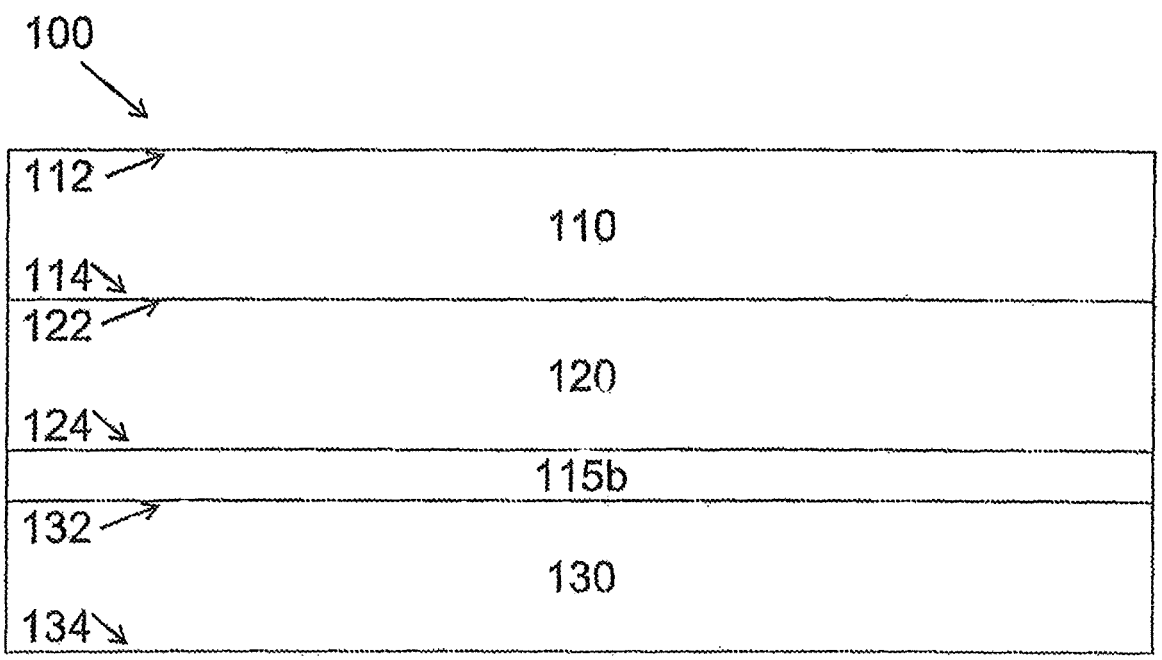
FIG. 4B is a cross-sectional view of an adhesive tape in accordance with certain embodiments of the present disclosure.

FIG. 4B is a cross-sectional view of an adhesive tape 100 which is similar to that of FIG. 4A. The difference between these drawings is the location of the functional fiber layer. In FIG. 4B, the functional fiber layer 115b is located between the carrier layer 120 and the adhesive layer 130. The functional fiber layer 115b is stitch bonded to the bottom surface 124 of the carrier layer 120.

Where layers are illustrated adjacent to each other in the drawings, it should be understood that they may be in direct physical contact or one or more intermediate layers (not shown) may be included there between. For example, tie layers may be included to promote adhesion. Other optional layers can include foam, nonwoven pad, knitted or structural netting, film, metallized sheet, etc. that could impart structural characteristics, thermal, electrical, noise insulation, enhanced strength in length or width, etc.

In some embodiments, the carrier layer 120 comprises polyester (e.g., polyethylene terephthalate (PET)) or polyethylene or polypropylene or other polymers or cellulose or natural fibers (e.g., cotton, hemp, flax, etc.).

Figure 5:
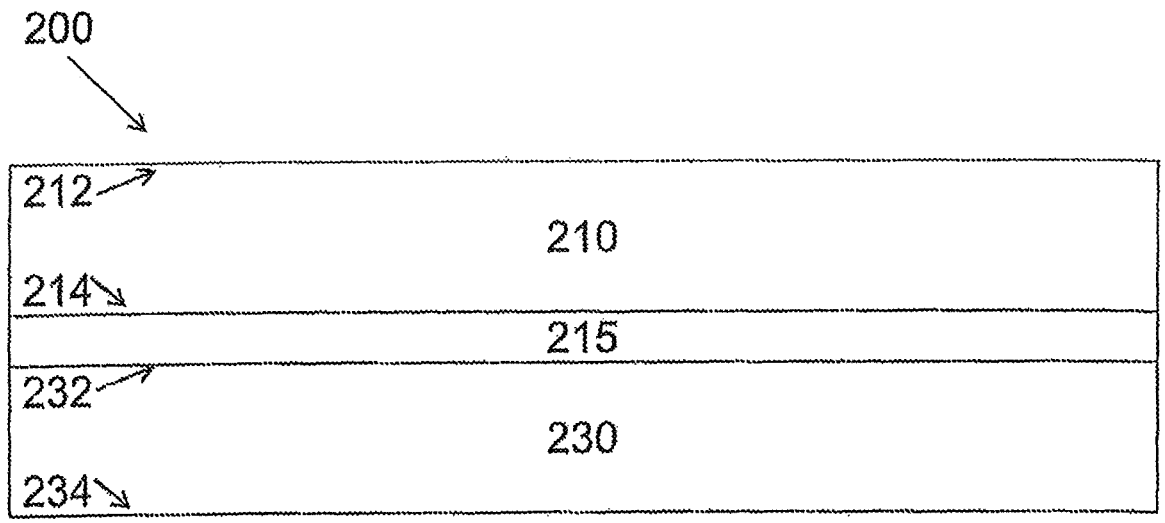
FIG. 5 is a cross-sectional view of another adhesive tape in accordance with certain embodiments of the present disclosure.

FIG. 5 is a cross-sectional view of another adhesive tape 200 in accord with some embodiments of the present disclosure. The tape 200 includes a substrate (e.g., film) layer 210 having a top surface 212 and a bottom surface 214, an adhesive layer 230 having a top surface 232 and a bottom surface 234, and a functional fiber layer 215 between the substrate layer 210 and the adhesive layer 230. The functional fiber layer 215 is stitch bonded to the bottom surface 214 of the substrate layer 210.

Figure 6:
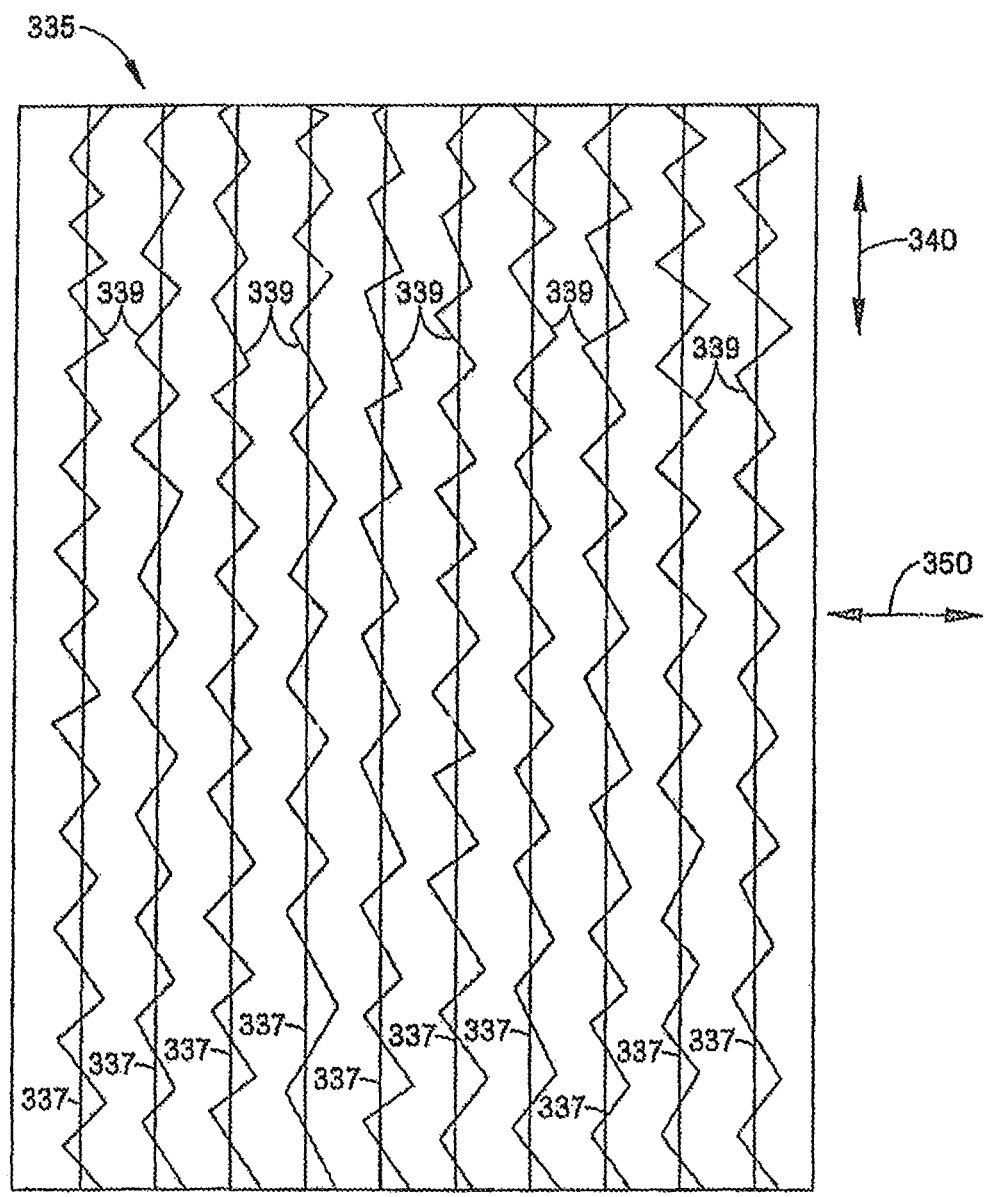
FIG. 6 is a top or bottom view of a stitch-bonded surface in accordance with certain embodiments of the present disclosure.

FIG. 6 is a top or bottom view of a stitch-bonded surface 335 in accordance with selected embodiments of the present disclosure. The arrows designate the machine (or long axis) direction 340 and the transverse or cross (or short axis) direction 350. A plurality of functional fibers 337 are secured to the surface via stitching fibers 339. The stitching fibers 339 generally cross over (back and forth) the functional fibers 337 to secure the functional fibers 337 to the surface. The surface 335 may represent one or more of the top surface 112, 212 of the substrate layer 110, 210; the bottom surface 114, 214 of the substrate layer 110, 210; the top surface 122 of the carrier layer 120; and the bottom surface 124 of the carrier layer 120 as illustrated in FIGS. 4 and 5.

The functional fibers and optionally the stitching fibers may be visible through one or both of the adhesive and/or the substrate layer. The substrate layer and the functional fibers can be of different colors. The substrate layer can be transparent and the functional fibers are colored. The stitching fibers can be of different color than the functional fibers. The stitching fibers can be visible on the top surface of the tape when its applied. The substrate and the stitching fibers can be contrasting colors of almost any combination.

The substrate layer 110, 210 may protect the carrier layer 120 and adhesive layer 130, 230 from environmental conditions (e.g., water). In some embodiments, the substrate layer comprises polyethylene, polypropylene, polyvinyl chloride, and/or polyester. The substrate layer may have a thickness of from about 1 to about 20 mils, including from about 2 to about 15 mils. In some embodiments, the substrate layer has a thickness of from about 0.90 to about 1.45 g/cm$^3$.

The substrate layer may include one or more additives. In some embodiments, the additive(s) is/are selected from ethylene vinyl acetate, ethylene methyl acrylate, calcium carbonate, pigment, colorant, clay, and TiO$_2$. The substrate may be a monolayer or may comprise a plurality of sublayers.

The carrier layer 120 may comprise polyester or polypropylene or polyethylene or a manufactured regenerated cellulose fiber material (e.g., Rayon). The carrier layer may have a thickness of from about 1 to about 15 mils, including from about 2 to about 10 mils.

In some embodiments, the adhesive layer 130, 230 comprises a pressure sensitive adhesive. The adhesive composition may be engineered for the structural characteristics of the substrate/stitched substrate. For example, it may be balanced to achieve a performance considering the interaction with the characteristics of the substrate (e.g., stiffness, bending strength, etc.). In some embodiments, the adhesive layer contains one or more of natural rubber, butyl rubber, acrylic rubber, synthetic rubber, a butyl adhesive material, and an acrylic adhesive material. The adhesive layer may have a thickness of from about 1 to about 15 mils, including from about 2 to about 10 mils.

The tape may have an overall thickness of from about 5 to about 40 mils, including from about 10 to about 25 mils.

The functional fibers may be visible through the adhesive and/or the substrate layer and provide some distinctive visual attribute. The stitching fibers may be visible through the adhesive and/or the substrate layer and provide some distinctive visual attribute. In some embodiments, the combination of functional fibers and stitching fibers provide a desired aesthetic appearance (e.g., a desired color scheme or a design indicative of the extreme functionality, strength, elasticity, and/or other properties of the tape). The design topic could include the cross machine stretch/flexibility, elasticity (potential), content of proprietary fibers/materials, etc.

The stitching fibers may impart a surface character that will be discernible by touch. The functional fibers may impart a tactile feel running in the machine direction or other direction in which functional properties (e.g., strength) are desired.

In embodiments wherein the functional fibers are stitched to the carrier layer, the carrier layer may impart a slight body to the tape.

The tensile strength of the adhesive tape may be greater than about 50 pounds per linear inch, including greater than about 100 pounds per linear inch, greater than about 150 pounds per linear inch, greater than about 200 pounds per linear inch, greater than about 250 pounds per linear inch, and greater than about 300 pounds per linear inch.

In some embodiments, the tensile strength is from about 100 pounds per linear inch to about 500 pounds per linear inch.

A suitable fiber denier can be determined by setting the desired strength based on the application, measuring the strength per denier, and calculating the denier needed to achieve the desired strength. In certain embodiments, the denier of the functional fibers will be different than the denier of the stitching fibers. For example, the functional fibers can have a smaller or larger denier. Similarly, it is envisioned that the material of the functional fibers can be different from the stitching fibers. Similarly, it is contemplated that different denier functional fibers are used across the width of the tape. For example, it may be advantageous to employ higher denier fibers adjacent the tape edges.

Accordingly, the strength of tape products produced according to some embodiments of the present disclosure may be easily tunable. The tape may have a full extension strength of at least 30 pounds, including at least 40 pounds, at least 50 pounds, at least 60 pounds, at least 70 pounds, and at least 80 pounds.

In some embodiments, the strength improvement is desired in the machine direction and there are no functional fibers in the transverse direction, thereby allowing the substrate to be stretched or pulled in the transverse/cross direction for conformability.

In some embodiments, the tape is hand-tearable in the machine direction between the functional fibers. This permits a customer to adjust the dimensions of each piece of tape. In some embodiments, the tape is pre-cut or perforated to tear in one or both of the cross or machine directions at predetermined lengths.

In some embodiments, elastic (e.g., spandex) fibers can be enclosed in a sheath of other functional fibers (e.g., structural fibers). Once elongated, the sheath provides tensile strength at the fullest extension. In other embodiments, other functional fibers (e.g., structural fibers) can be enclosed in a sheath of elastic fibers.

The maximum elongation may be from about 20% to about 50%, including from about 25% to about 40%, and from about 30% to about 35%.

The functional fibers generally enhance one or more properties of the adhesive tape. Non-limiting examples of functional fibers include elastic fibers and structural fibers. The functional fibers can be monofilament fibers or bundles of fibers (i.e., multiple strands). The elastic fibers can allow the tape to behave like a bungee cord, stretch and then recover strength. The structural fibers can impact initial strength and/or the properties such as conductibility and/or conductivity.

Non-limiting examples of functional fiber materials include polyester fibers, carbon fibers, and aramid fibers (e.g., para-aramid fibers (such as KEVLAR® from DuPont) and meta-aramid fibers (such as NOMEX® from DuPont). Of course, in addition to the denier discussion above, the material selected for the functional fiber will influence the tape strength and elastic characteristics. In some embodiments, the fibers are coated to enhance chemical resistance, enhance flame resistance, increase/modify cohesion, increase/modify interlaminar bonding, and/or adjust other properties.

The fibers may be a combination of materials, with each fiber selected for its individual performance and its composite contribution to desired properties. Carbon fiber, electrical wire, elastic fiber, or other fibers may be stitched in location alone or in combination with other fibers. For example, every $n^{th}$ fiber (e.g., $5^{th}$ fiber) could be an electrical wire or a sensor wired to detect temperature, pressure, etc. or to dissipate or conduct current.

In some embodiments, the fibers are cut and/or break resistant.

The elastic fibers may have an elasticity of from about 25% to about 100% elongation. The elastic fibers may exhibit recovery with engineered extension and recovery force, dependent on the application. The elastic fibers may exhibit full extension tensile strength of from about 25 to about 200 pounds per linear inch. The fiber denier, diameter, and density will vary depending on the fiber material and desired performance characteristics.

The stitching fibers may include one or more materials selected from polyester, carbon and carbon compounds, specialty fibers including Kevlar, aramids, fiberglass, ultra-high-molecular-weight polyethylene (such as spectra and Dyneema), polyethylene, polypropylene, silk, spandex, rubber, vinyl, and nylon.

In some embodiments, the stitching fibers include structural sheathes, coatings, and/or windings to provide extension control and/or high tensile strength.

An engineered release composition or a release liner may be used in conjunction with the adhesive. The release composition may be applied to the top or back surface of the tape, allowing the adhesive to come in contact with the engineered fibers that are stitched through the substrate to allow a calibrated release allowing the tape to be unwound, but balance the character of the unwind force, clean removal from the back of the tape and fibers, non-contamination of the adhesive, etc.

The engineered release system can be formulated in conjunction with the adhesive and one or both of the stitching fibers and/or the functional fibers. The release system can be applied to the top or back surface of the tape allowing the adhesive to come in contact with the engineered fibers that are stitched through the substrate to allow a calibrated release allowing the tape to be unwound, but balance the character of the unwind force, clean removal from the back of the tape & fibers, non-contamination of the adhesive, etc. The selected release composition can be selected to facilitate unwinding of a spooled adhesive tape. In this regard, the release composite can be selected to be interactive with the material(s) selected for the functional fiber(s). One exemplary release composition includes silicone and/or acrylic and/or chromium complex and/or fluorinated chemistries.

Figure 7:
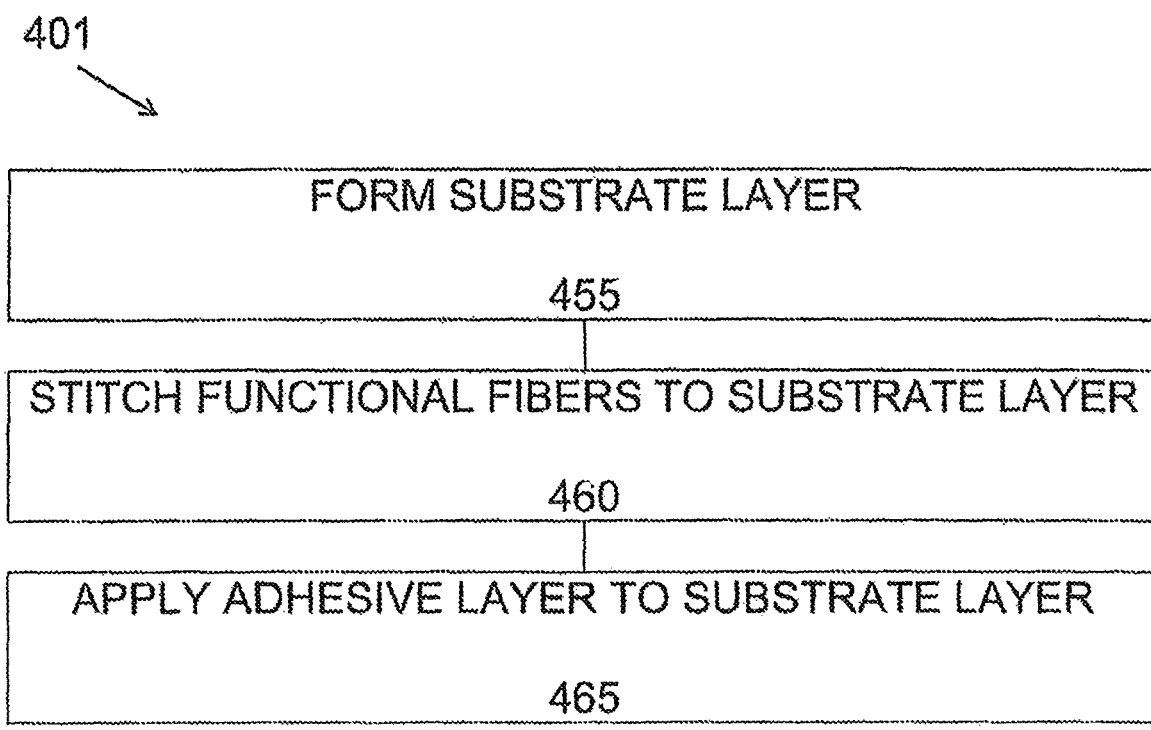
FIG. 7 is a flow chart illustrating a method in accordance with certain embodiments of the present disclosure.

FIG. 7 is a flow chart illustrating a method for forming an adhesive tape 401 in accordance with some embodiments of the present disclosure. The method 401 includes forming a substrate (e.g., film) layer 455, stitching functional fibers to the substrate layer 460, and applying an adhesive layer to the substrate layer 465. The stitching 460 may include feeding the substrate layer and functional fibers to a stitch-bonding machine, whereby the functional fibers are secured to a surface of the substrate layer via stitching fibers.

Figure 8:
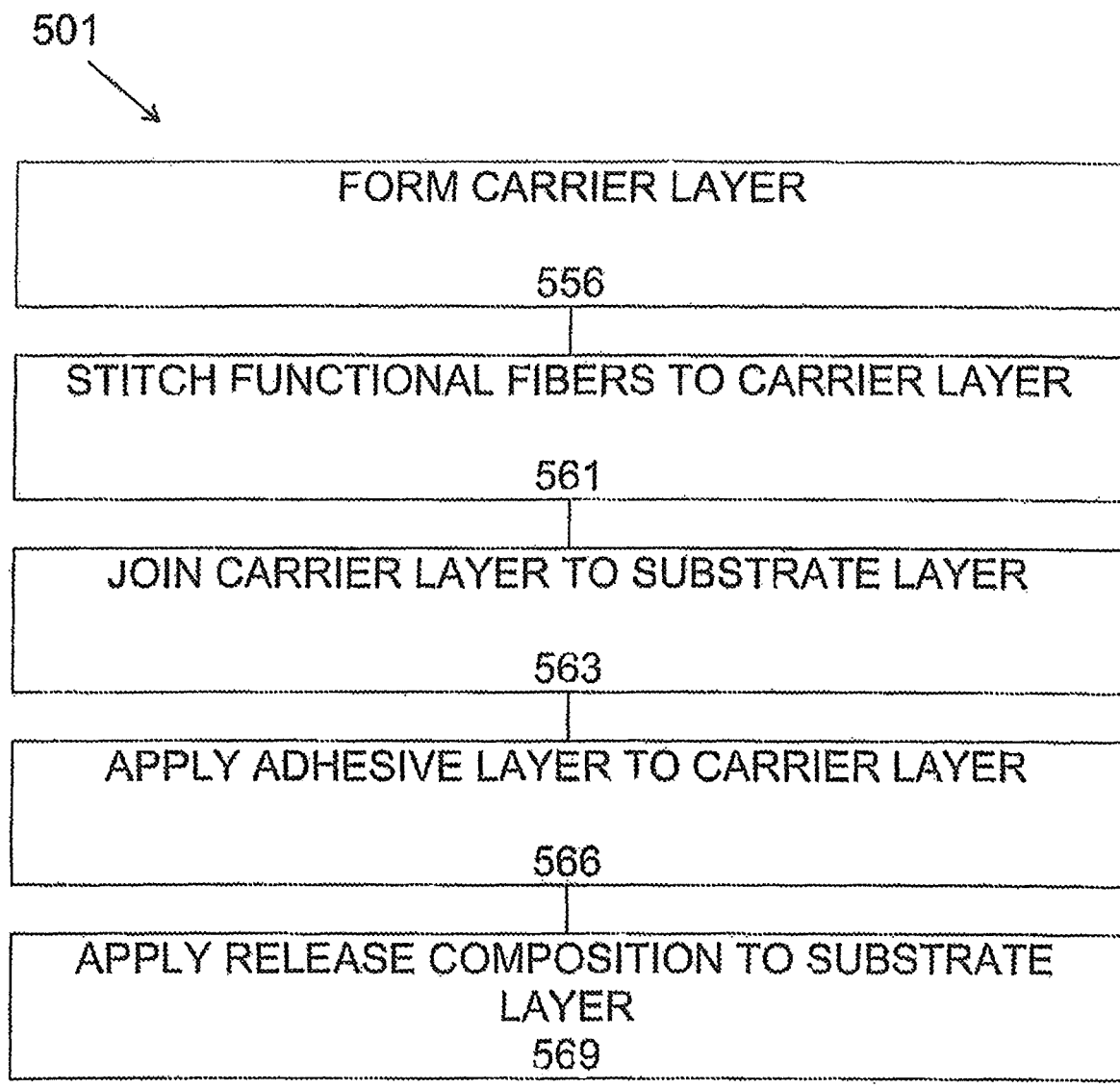
FIG. 8 is a flow chart illustrating another method in accordance with certain embodiments of the present disclosure.

FIG. 8 is a flow chart illustrating another method for forming an adhesive tape 501 in accordance with some embodiments of the present disclosure. The method 501 includes forming a carrier (e.g., nonwoven, foam, etc.) layer 556, stitching functional fibers to the carrier layer 561, joining the carrier layer to a substrate (e.g., film) layer 563, applying an adhesive layer to the carrier layer 566, and applying a release composition to the substrate layer 563. The stitching 561 may include feeding the carrier layer and functional fibers to a stitch-bonding machine, whereby the functional fibers are secured to a surface of the carrier layer. In some embodiments, joining the carrier layer to a substrate layer may include feeding the stitch-bonded carrier to calendaring equipment, whereby a substrate layer is melt extruded to the carrier. In some embodiments, the method may include a step of applying a release composition 569 to the substrate layer. Although not depicted, this step is also optional in the method of FIG. 7.

FIG. 9 includes a cross-sectional drawing of an adhesive tape in accordance with some embodiments of the present disclosure, a schematic illustration of a system for producing the tape, and a flow chart illustrating a method which may be used to produce the tape. In the depicted embodiment, the fibers are stitched directly to the substrate (e.g., film). Particularly, in a first step 601 a film roll 603 provides a sheet of film material 605 to stitch bonding machine 607. Structural fibers 609 are provided from spool 611 to the stitch bonding machine 607. Stitching fibers 613 are provided from spool 615 to stitch bonding machine 607 wherein the structural fibers 609 are attached to the film sheet 605 to provide a reinforced tape backing sheet 617 which is wound onto roll 619 for further processing. Roll 619 is transported to a tape manufacture assembly step 620, wherein backing sheet 617 is fed to adhesive applicator 621 to form an adhesive inclusive sheet 618 and optionally a release coat applicator 623. The completed tape sheet material 624 is then rolled 625 and transported or stored for trimming in accord with traditional tape manufacturing processes. With respect to process flow, the tape backing is stitch bonded with functional fiber and rolled 627. The rolled tape backing then receives adhesive and optionally a release coat 629 and is again rolled. The adhesive inclusive fiber reinforced tape sheet is then slit into appropriate tape widths, rolled, and packaged 631.

Figure 10:
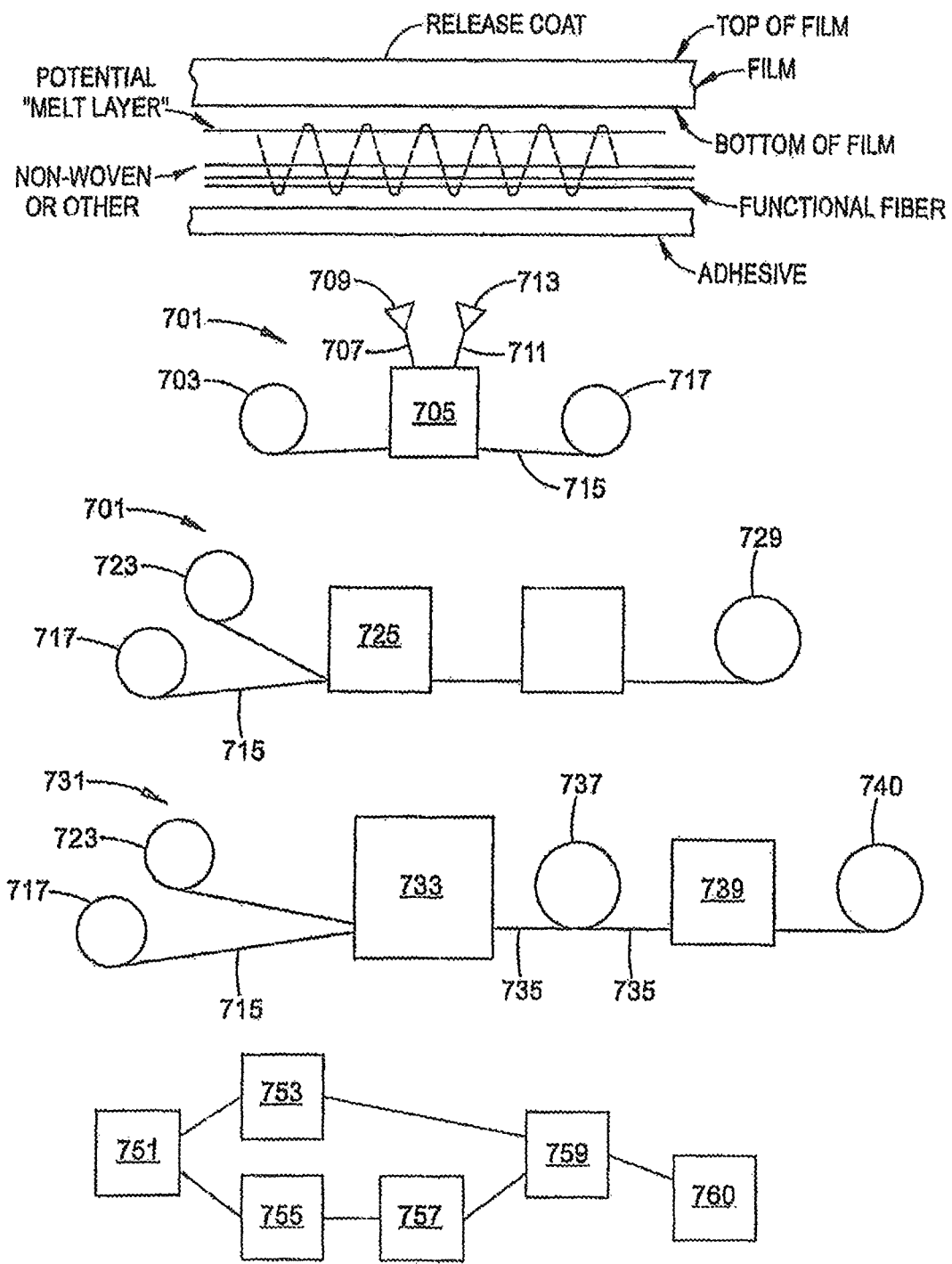
FIG. 10 includes a cross-sectional drawing of an adhesive tape in accordance with some embodiments of the present disclosure, a schematic illustration of a system for producing the tape, and a flow chart illustrating a method which may be used to produce the tape.

FIG. 10 includes a cross-sectional drawing of an adhesive tape in accordance with some embodiments of the present disclosure, a schematic illustration of a system for producing the tape, and a flow chart illustrating a method which may be used to produce the tape. In the depicted embodiments, the fibers are stitched to a carrier (e.g., nonwoven) prior to bonding to the substrate (e.g., film). In this embodiment, a first functional fiber inclusive fabric formation step 701 is provided. Particularly, a rolled substrate 703 (for example polyolefin sheet or fleece or non-woven) is fed to stitch bonding machine 705 wherein functional fiber 707 is received from spool 709 and stitch bonded to substrate 703 using stitching fiber 711 received from spool 713. The fabric 715 is then rolled 717 for further processing. In process step 721, fabric 715 is co-fed with tape backing substrate 723 into an adhesive applicator 725, release coat applicator 727 and then rolled 729 for further processing. At process step 731 an alternative tape formation procedure is depicted. In this configuration, fabric 715 is co-fed with tape backing substrate 723 into melt processor 733 wherein one or both of the fabric carrier and the tape backing substrate are melted and joined together to form reinforced tape sheet 735 which is rolled 737. Reinforced tape sheet 735 can then be fed to adhesive applicator 739 (application of a release coat is a further optional step—not shown) to obtain a finished tape sheet 740. With respect to process flow, a fiber reinforced fabric is formed 751, the fabric is joined with a tape backing using either adhesive 753 or melt adherence 755. If melt adherence 755 is used, adhesive is applied to the tape sheet 757. The adhesive inclusive tape sheet is then treated with a release coat 759 and again rolled. The adhesive inclusive fiber reinforced tape sheet is then slit into appropriate tape widths, rolled, and packaged 760.

Figure 11:
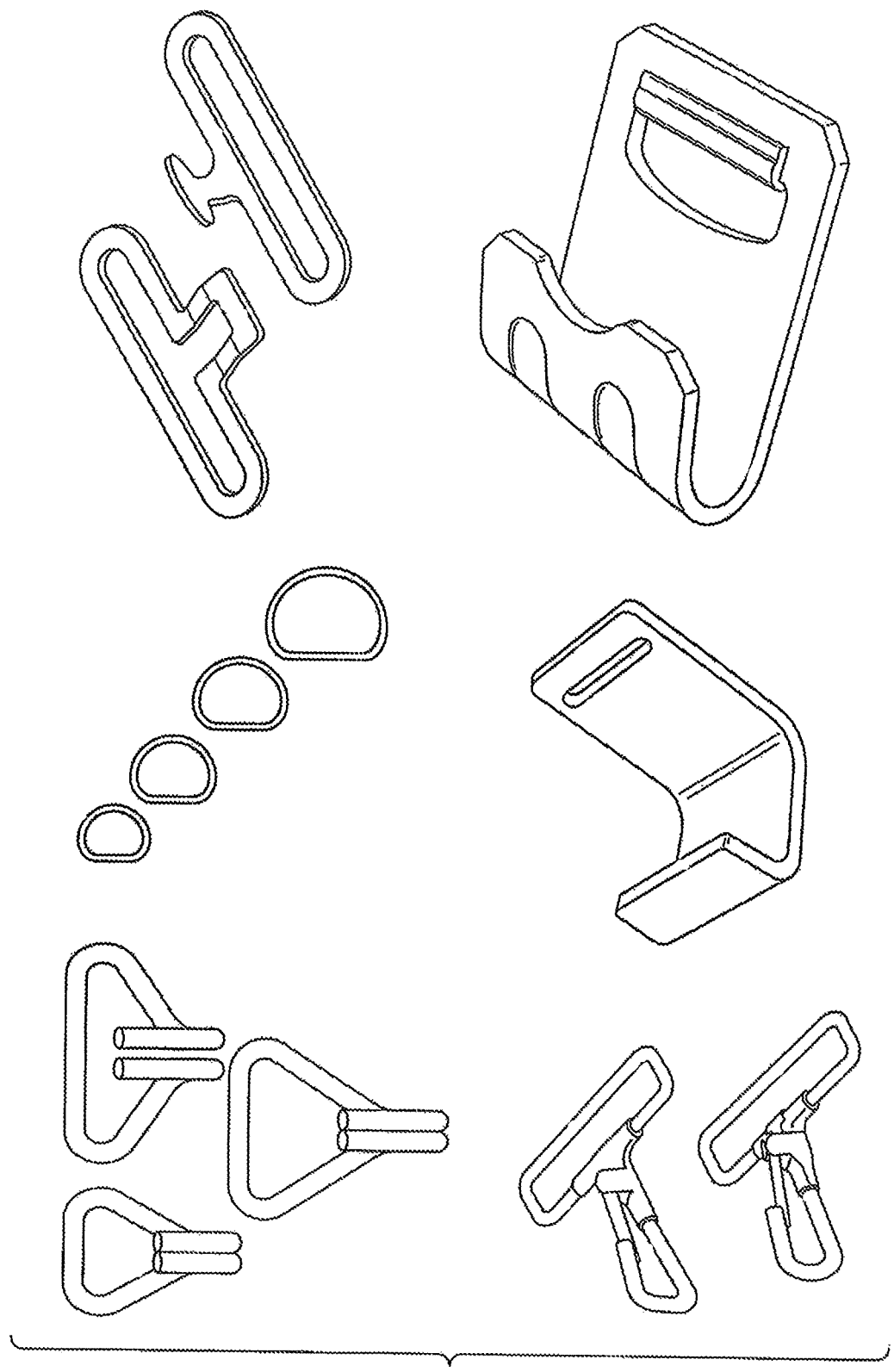
FIG. 11 illustrates various other hook and ring designs that may be used in connection with the tape securing system of the present application.

FIG. 11 illustrates various other hook and ring designs that may be used in connection with the tape securing system of the present application.

FIG. 12 illustrates two additional hook designs with different hook shapes and/or roller placement. These configurations may prevent the tape from binding up when pulled through the hooks. In the left embodiment, the opening through which the tape is fed is curved in nature and supporting several small rollers positioned along that curvature. Conceptually, this design will allow the tape to freely move both in the tape direction, through the opening, and laterally, along the horizontal axis of the hook, to allow for greater ease of use and avoid 'binding'. This 'binding' would involve the adhesive of the tape sticking to the side of the hook and impeding smooth operation of the tape/hook system. In the right embodiment, the 'main' opening through which the tape is fed is flanked on both sides by extended openings along the sides of the hook creating a larger "U" shaped opening. Three rollers (1 positioned at the bottom and 2 along the sides of this "U") will work in conjunction to allow for unrestricted passage of the adhesive tape material through the opening. As with the left embodiment, conceptually, this design will allow the tape to freely move both in the tape direction, through the opening, and laterally, along the horizontal axis of the hook, to allow for greater ease of use and avoid 'binding'. This 'binding' would involve the adhesive of the tape sticking to the side of the hook and impeding smooth operation of the tape/hook system.

The tapes of the present disclosure may offer enhanced properties for wrapping, holding, securing, sealing, bundling, pulling tight/taking slack out, closing, holding closed, holding tight, etc.

In some embodiments, the tape is a box-sealing tape, double-sided tape, duct tape, kinesiology tape, electrical tape, marking tape, friction tape, gaffer tape, masking tape, or surgical tape.

The composition, dimensional characteristics, mono filament versus engineered bundle, etc. can provide novel performance of the tape and the overall characteristics and/or type of suitable applications. Moreover, a wide range of fiber, denier and/or materials can be stitch bonded to the substrate. It can even be a combination of materials. In one version, a structural polyester fiber with each fiber selected for its individual performance and then its composition contribution to the tensile strength is selected. Individual fiber selection can be varied to give a physical characteristic to the tape, i.e. could be thick/large diameter or small to either be felt or seen as desired. Multiple layers could be stitch bond together in addition to the structural fibers. There could be a foam, nonwoven pad, knitted or structural netting, film, metallized sheet, etc. that could impact structural characteristics, thermal, electrical, noise insulation, enhanced strength in length or width, etc.

Figure 13:
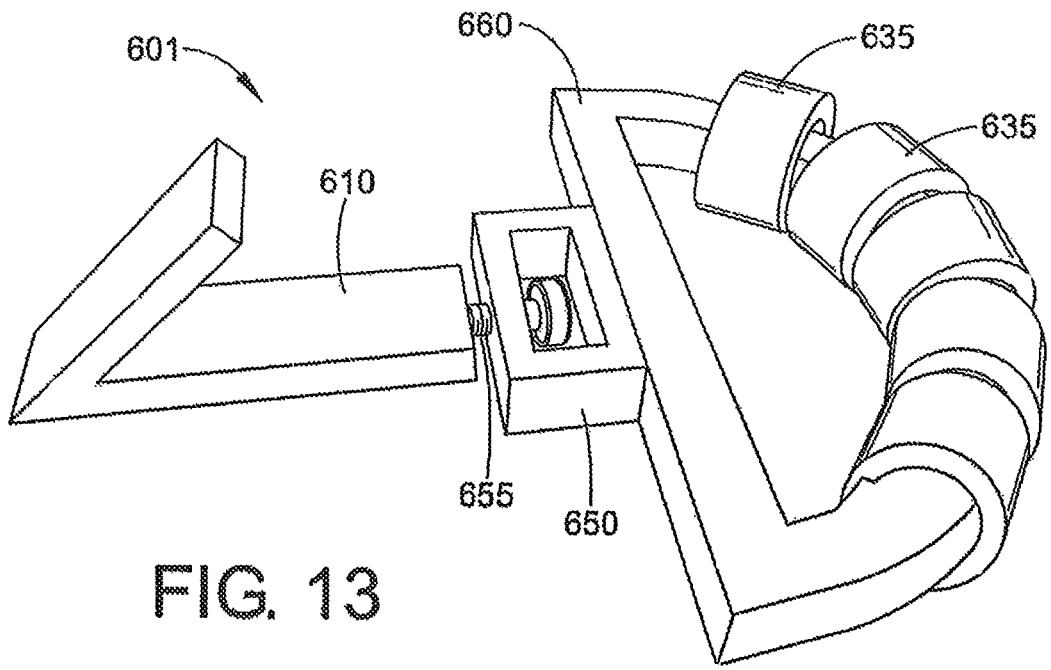
FIG. 13 is a perspective view of a securing system in accordance with some embodiments of the present disclosure.
Figure 14:
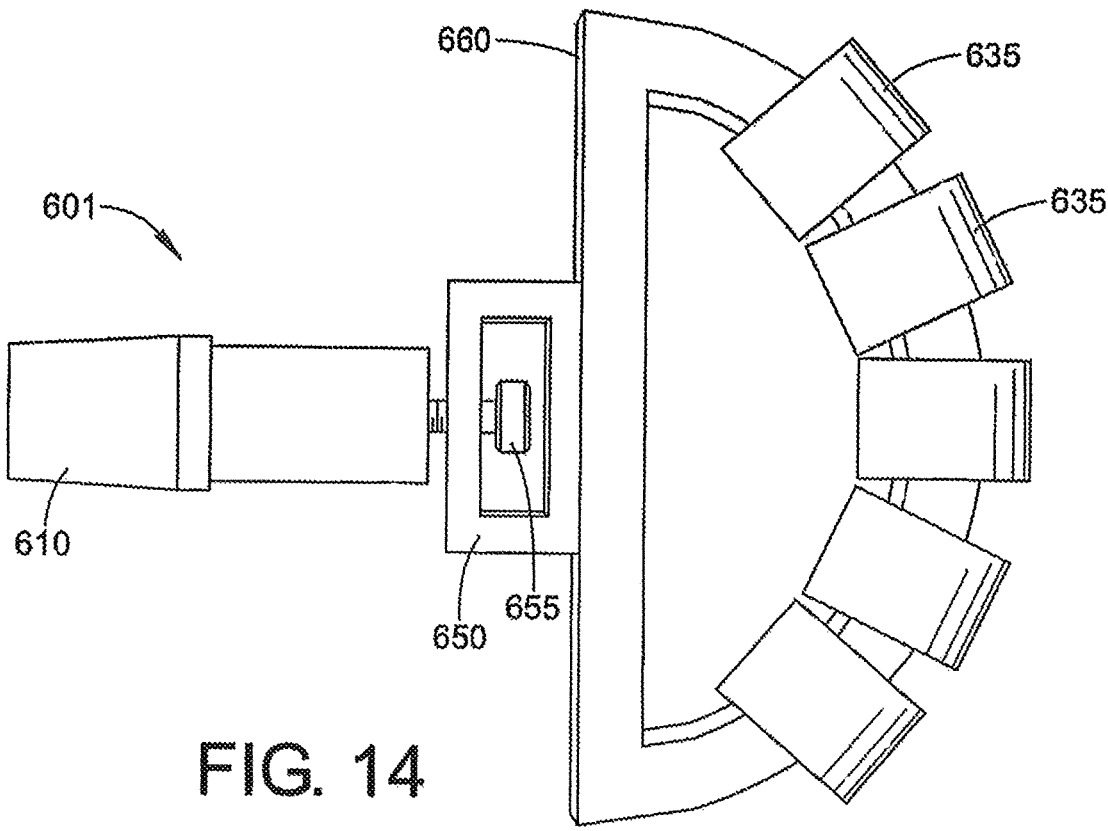
FIG. 14 is a top view of the securing system of FIG. 13.
Figure 15:
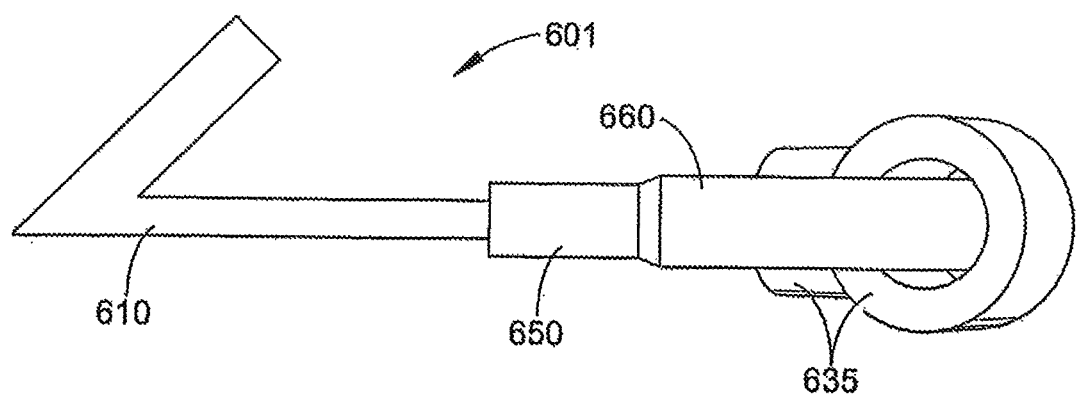
FIG. 15 is a side view of the securing system of FIGS. 14 and 15.

FIGS. 13-15 depict another securing system 601 in accordance with some embodiments of the present disclosure. The system 601 includes a hook 610 secured to a roller frame 660 via a swivel connector 655. The swivel connector 655 permits rotation of the roller frame 660 relative to the fastener 610 or vice versa. A swivel housing 650 may be included in some embodiments. The roller frame 660 receives at least one (e.g., five in the depicted embodiment) roller 635. The hook 610 and the swivel connector 655 may be integral or separate parts.

Figure 16:
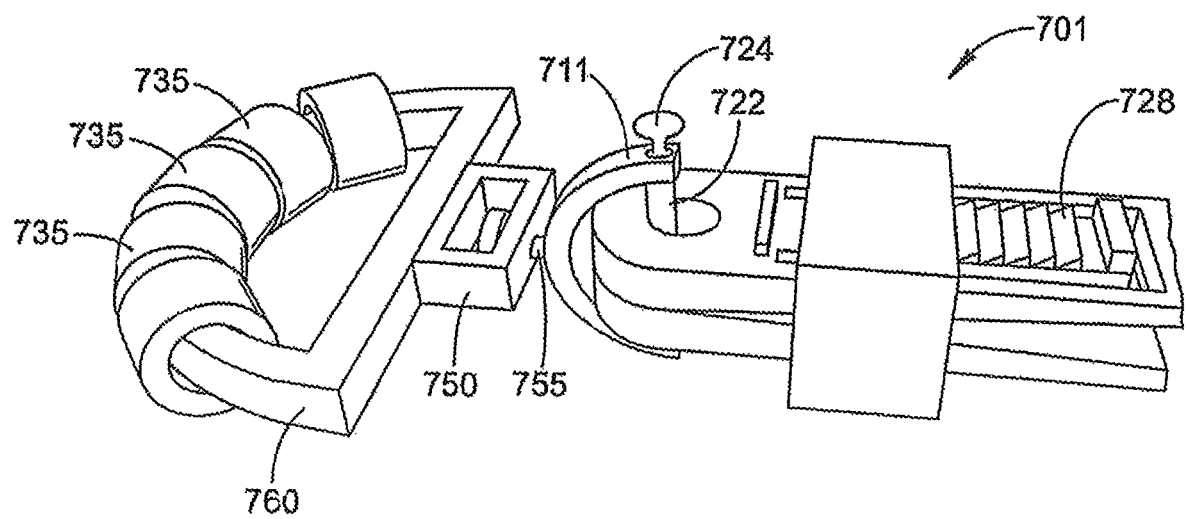
FIG. 16 is a perspective view of a securing system in accordance with some embodiments of the present disclosure.
Figure 17:
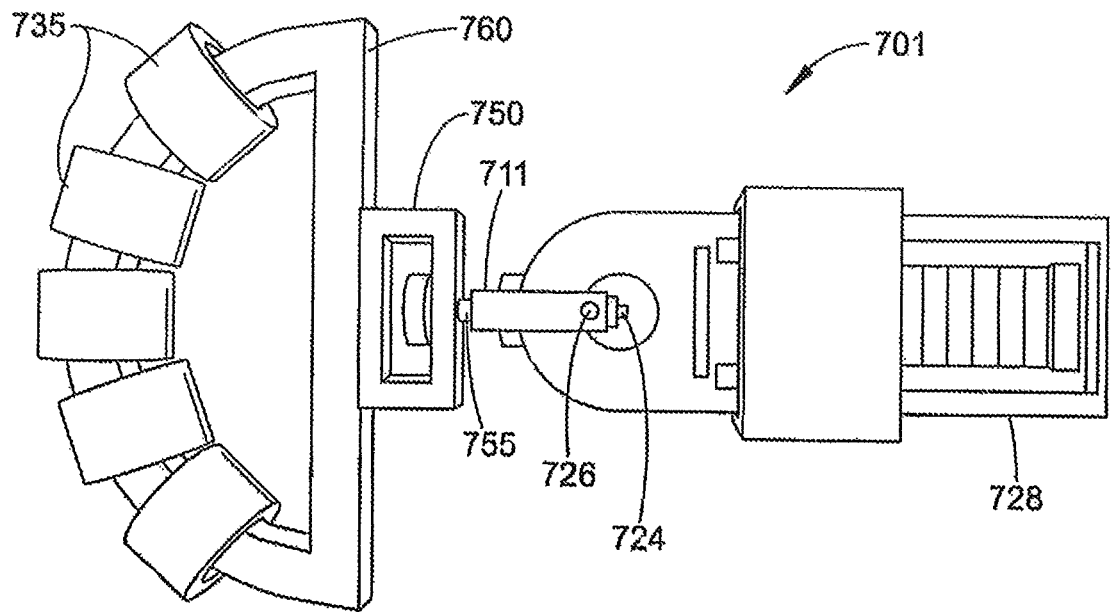
FIG. 17 is a top view of the securing system of FIG. 16.
Figure 18:
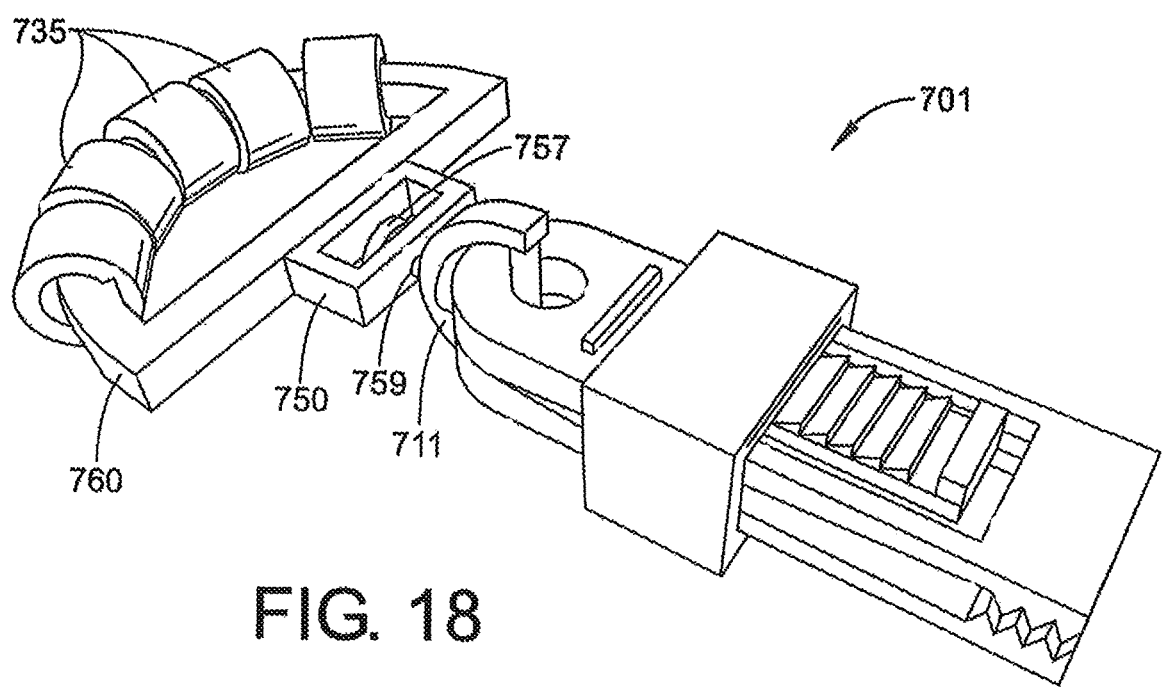
FIG. 18 is a side view of the securing system of FIGS. 16 and 17 with an alternate swivel securing arrangement.

FIGS. 16-18 depict another securing system 701 in accordance with some embodiments of the present disclosure. The system 701 includes a clip 711 secured to a roller frame 760 via a swivel connector 755. The swivel connector 755 permits rotation of the roller frame 760 relative to the tarp clasp 728 or vice versa. A swivel housing 750 may be included in some embodiments. The roller frame 760 receives at least one (e.g., five in the depicted embodiment) roller 735. The clip 711 may secure the system to a target and/or to another fastener. The clip 711 and the swivel connector 755 may be integral or separate parts.

For example, the clip 711 may be secured using pin 722 including a rotatable head 724 received in a threaded bore 726. Accordingly, pin 722 can selectively engage clip 711 allowing detachment from tarp clasp 728 (FIGS. 16-17).

In FIG. 18, the swivel is detachable from roller frame 760 via a head 757 threadedly attached to post 759.

The hook 610 and the clip 711 may be replaced by other types of fasteners. Furthermore, multiple fasteners may be included. When the system includes multiple fasteners, they may be of the same type or different types. Multiple fasteners may be connected to the roller frame via the same swivel connector or via separate swivel connectors.

The securing system may be modular. In some embodiments, a securing system kit includes a plurality of different fasteners which can easily be attached or removed from the roller frame 660. The different fasteners may be of different types and/or different sizes.

In some embodiments, the swivel connector extends directly through the roller frame in the absence of a separate swivel housing. Alternatively, a swivel housing may be included within the roller frame (in contrast to FIGS. 12-18 where the swivel housing is depicted outside of the roller frame).

The swivel housing may be open (as shown in FIGS. 12-18) or closed.

Although the roller frame in FIGS. 13-18 includes a curved portion for receiving the rollers, it should also be understood that other shape may also be used. For example, rollers may be attached to one or more straight portions of the roller frame.

When the swivel housing is included, the roller frame and the swivel housing may be integral or separate parts.

Any individual component or combination of components may be release-coated with a non-adhesive material (e.g., silicone) to prevent adhesion of the tape.

The tape may be provided via a ratchet mechanism.

The ability to rotate the tape using the swivel connector allows a user to prevent the adhesive side of the tape from undesirably contacting certain surfaces. For example, the securing system may be used to secure items during moving. It may be undesirable for the adhesive surface to contact the items or a cover (e.g., a tarp) on the items. Rotating the tape may ensure that the tape surface that contacts the items/cover is the non-adhesive surface.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A securing method comprising:
attaching a securing system to an object, the securing system comprising:
a first fastener having a fastener end; and
a roller end;
feeding an adhesive tape around the roller, wherein the tape is looped around the roller with an adhesive side of a portion of the tape secured to an opposed portion of an adhesive side of the tape to create two joined layers of tape, the length of the joined layer of tape being selected by a person assembling the securing system such that a section of a single layer of the tape having an exposed adhesive surface extends away from the first fastener;
adhering a first portion of the adhesive tape which has passed through the frame to a second portion of the adhesive tape which has not passed through the frame;
providing a second fastener having a fastener end and a roller end, feeding the single layer of adhesive tape around the roller of the second fastener wherein the tape is looped around the roller of the second fastener with an adhesive side of a portion of the tape secured to an opposed portion of an adhesive side of the tape to create two joined layers of tape, the length of the joined layer of tape being selected by a person assembling the securing system such that a section of a single layer of the tape having an exposed adhesive surface extends away from the second fastener; and
securing the securing system to the object.

2. The method of claim 1, wherein the roller has a diameter in the range of about 0.5 to about 2 inches.

3. The method of claim 1, wherein the roller has a length in the range of about 1 to 3 inches.

4. The method of claim 1, wherein the roller comprises a ceramic, silicone, a fluoropolymer, plastic, polymeric, steel, aluminum, or carbon fiber.

5. The method of claim 1, wherein the roller comprises a core and a non-stick surface layer.

6. The method of claim 5, wherein the non-stick surface layer comprises a ceramic, silicone, a fluoropolymer, plastic, polymeric, or carbon fiber.

7. The method of claim 1, wherein the roller is comprised of at least two independent sections.

8. The method of claim 1, wherein a swivel connects the fastener end to a frame.

9. The securing system of claim 8, wherein the swivel housing is selectively detachable from at least one of the fastener and the frame.

10. The method of claim 1 performed to secure a tarp to cover selected items.

* * * * *